United States Patent [19]

Svejda

[11] 4,037,668
[45] July 26, 1977

[54] GARDENING IMPLEMENT WITH OFFCENTER BALANCING WEIGHT

[76] Inventor: Terry M. Svejda, R.R. No. 2 Box 95, Mo. Valley, Iowa 51555

[21] Appl. No.: 676,852

[22] Filed: Apr. 14, 1976

[51] Int. Cl.² .............................................. A01B 1/08
[52] U.S. Cl. ..................................... 172/371; 172/611
[58] Field of Search ............... 172/371, 372, 373, 374, 172/611; 248/325, 364; 16/1 C, DIG. 8; 403/362; 273/81 A, 194 B; 272/70.1, 70.2, 122, 123, 124; 46/207

[56] References Cited

U.S. PATENT DOCUMENTS

| 531,027 | 12/1894 | Gist | 172/611 |
|---|---|---|---|
| 868,148 | 10/1907 | Williams | 172/371 |
| 893,627 | 7/1908 | Hosmer | 172/611 X |
| 933,986 | 9/1909 | Hosmer | 172/373 |
| 1,411,435 | 4/1922 | Hosmer | 172/611 |
| 2,280,778 | 4/1942 | Andersen | 172/371 |
| 2,555,189 | 5/1951 | Fuchslocher | 403/362 X |

FOREIGN PATENT DOCUMENTS

| 70,350 | 10/1915 | Austria | 272/124 |
|---|---|---|---|

*Primary Examiner*—Richard T. Stouffer
*Attorney, Agent, or Firm*—Robert D. Farkas

[57] ABSTRACT

A gardening implement used to hoe the earth, having a narrow blade portion substantially perpendicular to longitudinal axis of the handle. The handle supports an asymetrically proportioned weight secured selectively along two opposed longitudinal notches extending the length of the handle and utilized to effect the balance and inertial characteristics of the hoe.

3 Claims, 3 Drawing Figures

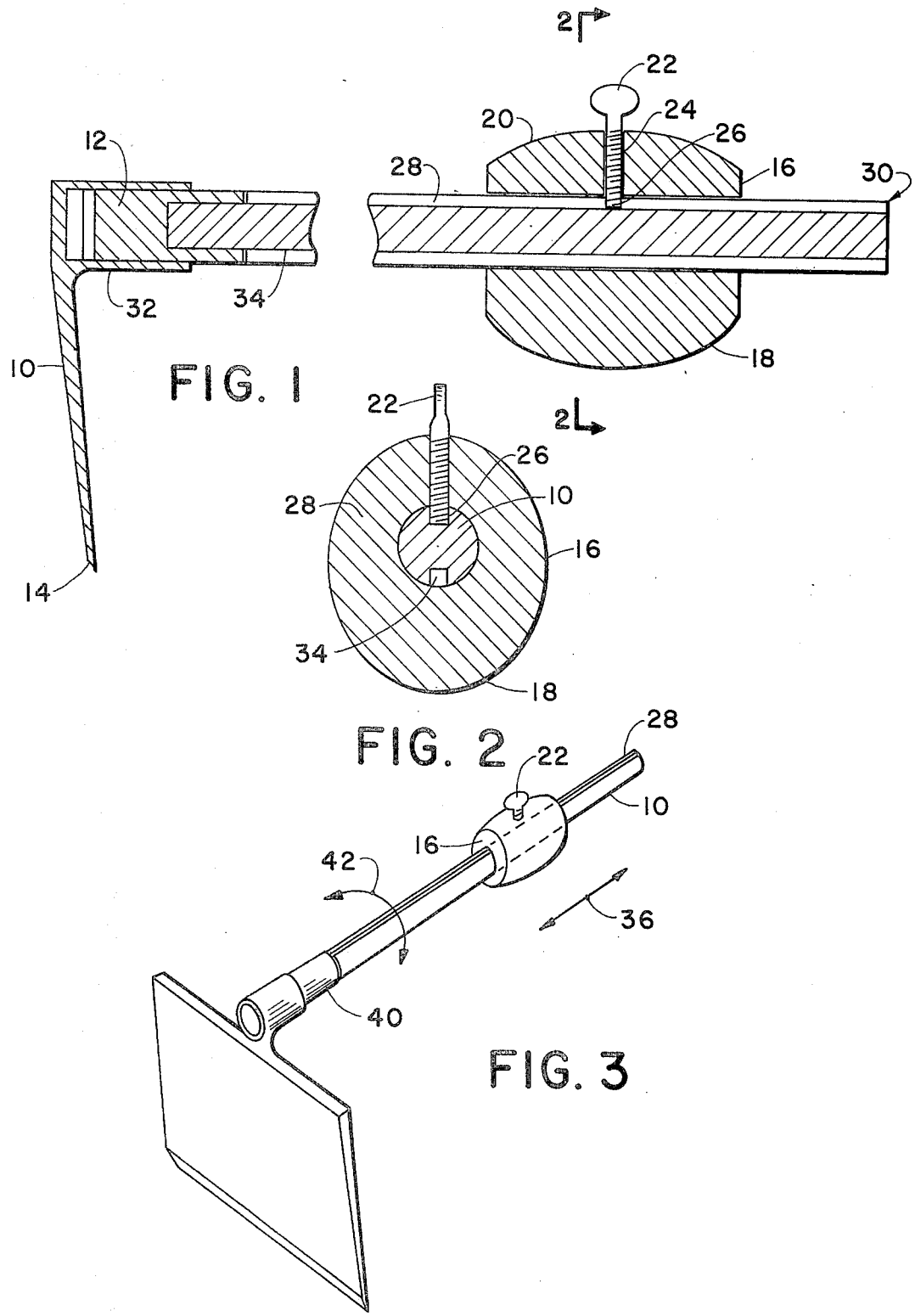

GARDENING IMPLEMENT WITH OFFCENTER BALANCING WEIGHT

BACKGROUND OF THE INVENTION

1. THE FIELD OF THE INVENTION

This invention relates to garden implements utilized as hoes and more particularly to that class having adjustable balancing weights therein.

2. DESCRIPTION OF THE PRIOR ART

The prior art abounds with hoes of various constructions supported on the end of longitudinal shafts. U.S. Pat. No. 671,381, issued on Apr. 2, 1901, to W. R. Jenkins, teaches a hoe employing a metal blade fabricated from sheet stock adapted to be fastened to a circular handle of uniform cross-section. U.S. Pat. No. 1,545,228 issued on July 7, 1925 to D. W. Bartran discloses a plate-like hoe element fastened to a section of a metallic hollow right angle cylinder and gusseted to the plate utilizing a ramped gusset element therefor. A circular handle is inserted and secured to the cylinder. U.S. Pat. No. 1,549,042 issued on Aug. 11, 1925 to S. Masters shows a metallic hoe element fastened to a circular uniform cross-section wooden handle utilizing a metallic joining sleeve therefore. All of the aforementioned patents suffer the common deficiency that the inertial characteristics of the hoe so constructed is fixed dependent upon the weight of the blade element and the length of the handle extending outwardly from the user's hands and the shape of the blade element disposed to one side of the axis of the handle.

SUMMARY OF THE INVENTION

A primary object of the instant invention is to provide a hoe whose inertial characteristics may be adjusted to compensate for the length of the handle grasped by the user.

Another object of the instant invention is to provide a hoe which can be balanced around the longitudinal axis of the handle.

Still another object of the instant invention is to provide a hoe which employs a balancing weight positioned along the length of the handle.

Yet another object of the instant invention is to provide a balancing weight asymetrically shaped thereby effecting the moment of inertia of the hoe relative to the longitudinal axis of the handle.

Still another object of the instant invention is to provide locating grooves for preferential locations of the balancing weight.

Most beaner hoes require careful an accurate use in order to avoid damage to the tender bean plant stalks. A variety of soil conditions may be encountered which force the user to employ more or less force when swinging the hoe, which entails accurate control of the hoe blade as it describes the arc terminating in contact with the earth. The instant invention utilizes a conventional hoe blade of some 2 to 3 inches in width secured sensibly at right angles to an operating handle having a constant circular cross-section, extending approximately 34 inches outwardly from the blade shank. An asymetrically shaped weight element is secured to the handle by allowing the handle to pass through a hole in the weight. A set screw secures the weight to the handle at selected locations along the length thereof. By rotating the weight so that the bulk of the mass is on the side of the handle opposite the blade or on the side the handle adjacent the blade, and by moving the weight along the length of the handle, the inertial characteristics of the hoe is modified to suit the stroke employed by the user and the soil characteristics in the area at which the hoe is to be utilized.

These objects as well as other objects of the present invention, will become readily apparent after reading the following description of the accompanying drawings.

BRIEF DESCRIPTION OF THE DRAWINGS

FIG. 1 is a cross-sectional, side elevational view of the instant invention.

FIG. 2 is a side elevation, cross-section view, taken through lines 2—2, as viewed in the direction of arrows 2—2, as shown in FIG. 1, showing the cross-section of the weight element.

FIG. 3 is a perspective view of the instant invention.

DESCRIPTION OF THE PREFERRED EMBODIMENT

A metallic plate element having a width of approximately 2¾ inches is fitted to one end of a circular uniform cross-section wooden shaft whose length is about 36 inches. The blade element extends substantially at right angles to the longitudinal axis and is asymetrically located substantially on one side thereof. The handle is adapted with two longitudinal notches disposed in a plane passing through the longitudinal axis of the handle and parallel to each other. The plane passes midway along the length of the sharpened edge of the plate element and at right angles thereto. The notches terminate at points equidistant from the blade shank and at a location adjacent thereto. Both points are joined by a circular notch passing through a plane located at right angles with the longitudinal axis of the handle.

A weight element, having smooth curved surfaces is fitted to the handle utilizing a hole non-centrically located in the weight element. A threaded hole, at right angles to the hole through which the handle passes, engages a thumb screw whose free end is adapted to be inserted anywhere along the grooves. Tightening the set screw locks the weight element in preferential position along the uppermost outermost surface of the handle or along the lowermost outermost surface of the handle. The circular groove facilitates rotating the weight element so that the locking screw thereof, without removal, can preferentially engage either of the longitudinal notches.

Now referring to the figures, and more particularly to the embodiment illustrated in FIG. 1, showing blade 10 affixed to handle 12. Sharpened edge 14 is utilized on the soil. Weight element 16 is provided with an end 18 disposed further outwardly from the axis of handle 12 then side 20 thereof. Thumb screw 22 engages a threaded hole 24 within weight 18, and upon tightening the free end 26 of screw 22 engages groove 28. Weight 16 may be moved along the length of groove 28 from a point 30 at the free end of handle 12 to circular groove 32. End 26 of screw 22, whilst loosely engaging groove 32, permits weight 16 to rotate 180° and then engage loosely, groove 34, allowing weight 16 to be selectively located and secured along the length thereof. Weight 16 is disposed so as to balance the weight of blade 10 by having the heavier portion 18 thereof adjacent groove 28.

FIG. 2 illustrates the handle 10 surrounded by the weight element 16 having the heavier portion 18 shown on the side opposite threaded thumb screw 22. The free end 26 of threaded thumb screw 22 engages groove 28 whilst groove 34 is shown vacant.

FIG. 3 illustrates handle 10 having thumb screw 22 engaged in groove 28 therein. Weight 16 can be moved in the direction of arrows 36 by alternate loosening and tightening of thumbscrews 22 after sliding weight 16 along the length of handle 10. Circular groove 40 enables weight 16 to be rotated in the direction of arrow 42 so that the distal end of screw 22 may engage the lowermost longitudinal groove, not shown.

One of the advantages is a hoe whose initial characteristics may be adjusted to compensate for the length of the handle grasped by the user.

Another advantage is a hoe which can be balanced around the longitudinal axis of the handle.

Still another advantage is a hoe which employs a balancing weight positioned along the length of the handle.

Yet another advantage is a balancing weight that is asymetrically shaped thereby effecting the moment of inertia of the hoe relative to the longitudinal axis of the handle.

A further advantage is a hoe which provides locating grooves for preferential locations of the balancing weight.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

The embodiment of the invention in which an exclusive privilege or property is claimed are defined as follows:

1. A gardening implement comprising a handle and a flat blade fixedly secured thereto whose lateral surfaces extend substantially perpendicular to the longitudinal axis of said handle, said longitudinal axis passing through said surfaces at a point adjacent a marginal edge of said plate, said plate having another marginal edge extending perpendicularly to said longitudinal axis, said another marginal edge for use on the earth in a gardening operation, a solid balancing weight, fastening means to selectively manually secure said balancing weight along the length of said handle, balancing means for balancing the weight of said plate by locating the centroid of gravity of said balancing weight at preferentially located surfaces of said handle, said fastening means including a threaded rod element threadingly engaged within said balancing weight, one end of said threaded rod element being disposed in clamping touching engagement with said handle, said balancing means including said balancing weight having a substantially geometrically off center hole passing through said balancing weight, said handle extending through said hole, said centroid of gravity of said balancing weight being located a distance substantially radially outwardly from the longitudinal axis of said hole.

2. The gardening implement as claimed in claim 1, wherein said fastening means further comprises a pair of longitudinal notches, said pair of notches extending substantially along the entire length of said handle, said pair of notches parallel to each other and lying in a first plane containing said longitudinal axis of said handle, said first plane passing through said another marginal edge of said blade and extending perpendicular thereto, said one end of said threaded rod being disposed at selected locations along the length of either of said pair of notches.

3. The gardening implement as claimed in claim 2, further comprising a circular notch in the surface of said handle communicating to the free ends of said pair of longitudinal notches, said circular notch lying in a second plane perpendicular to said longitudinal axis of said handle.

* * * * *